(12) United States Patent
LoPresti

(10) Patent No.: US 7,177,930 B1
(45) Date of Patent: Feb. 13, 2007

(54) METHOD AND SYSTEM FOR NETWORK TRAFFIC ANALYSIS WITH CONFIGURATION ENHANCEMENTS

(75) Inventor: Robert LoPresti, Stony Point, NY (US)

(73) Assignee: Network General Technology, George Town, Grand Canyon (KY)

( * ) Notice: Subject to any disclaimer, the term of this patent is extended or adjusted under 35 U.S.C. 154(b) by 760 days.

(21) Appl. No.: 10/268,774

(22) Filed: Oct. 11, 2002

(51) Int. Cl.
*G06F 15/173* (2006.01)

(52) U.S. Cl. .................. 709/224; 709/236; 709/223

(58) Field of Classification Search ................ 709/224, 709/223, 228
See application file for complete search history.

(56) References Cited

U.S. PATENT DOCUMENTS

| | | | | |
|---|---|---|---|---|
| 5,438,565 A | * | 8/1995 | Hemmady et al. | 370/335 |
| 5,740,172 A | * | 4/1998 | Kang | 370/392 |
| 6,041,053 A | * | 3/2000 | Douceur et al. | 370/389 |
| 6,061,345 A | * | 5/2000 | Hahn et al. | 370/351 |
| 6,154,446 A | * | 11/2000 | Kadambi et al. | 370/239 |
| 6,404,752 B1 | | 6/2002 | Allen, Jr. et al. | |
| 6,404,753 B1 | * | 6/2002 | Chien et al. | 370/337 |
| 6,744,783 B1 | * | 6/2004 | Tzeng | 370/469 |
| 6,801,940 B1 | * | 10/2004 | Moran et al. | 709/224 |
| 2003/0231630 A1 | * | 12/2003 | Messenger | 370/392 |
| 2004/0032829 A1 | * | 2/2004 | Bonn | 370/230 |

* cited by examiner

*Primary Examiner*—Saleh Najjar
*Assistant Examiner*—Dhairya A. Patel
(74) *Attorney, Agent, or Firm*—Fenwick & West LLP

(57) ABSTRACT

A system for network traffic analysis comprises a classification engine operable to parse received frames, each frame comprising a plurality of layers of protocols and each frame having a type corresponding to a highest layer protocol or network address of the frame, and to provide pre-analysis of the received frames to generate classification information on a flow-basis and on a per packet-basis, a filter processing engine operable to reduce the received frames based on a type of each frame indicated by the generated classification information to form information representing filtered frames and an analysis block operable to perform detailed analysis on layers of protocols of the filtered frames and generate objects representing the analysis.

8 Claims, 16 Drawing Sheets

METHOD AND SYSTEM FOR NETWORK TRAFFIC ANALYSIS WITH CONFIGURATION ENHANCEMENTS

CROSS REFERENCE TO RELATED APPLICATIONS

This application is related in subject matter to co-pending U.S. patent application Ser. No. 10/268,941 entitled "Method And System For Network Traffic Analysis With Deployment Enhancements," Ser. No. 10/268,940 entitled "Method And System For Network Traffic Analysis With Run-Time Behavioral Enhancements," and Ser. No. 10/268,939 entitled "Method And System For Network Traffic Analysis," all of which were filed by the same inventor of the present application on Oct. 11, 2002, said applications having a common assignee with the present application.

FIELD OF THE INVENTION

The present invention relates to a method and system for network traffic analysis that provides improved performance with modern, high performance networks and that provides flexibility in terms of the types and configurations of network traffic analysis that can be performed.

BACKGROUND OF THE INVENTION

As data communication networks have proliferated, the need has arisen for tools with which the functionality and performance of such data communication networks may be analyzed. Many conventional network traffic analysis tools were originally developed at a time when data communication networks were much simpler and slower than they are today. These networks were sufficiently low performance that even relatively inefficient and inflexible network traffic analysis tools were able to provide adequate performance.

However, even with such simpler and slower networks, many network traffic analysis tools were unable to handle all of the data on the network and so dropped packets of network traffic. This leads to a reduction in the accuracy of these conventional network traffic analysis tools. With modern, high performance networks, conventional network traffic analysis tools no longer provide adequate performance. Thus, a need arises for a network traffic analysis tool that can provide improved performance with modern, high performance networks.

In addition, conventional network traffic analysis tools provide only limited flexibility in terms of the types and configurations of network traffic analysis that can be performed. For example, with conventional network traffic analysis tool the level of analysis and the selection of protocols is relatively rigid and inflexible in that it is determined for the most part at compile-time, not at run-time. Conventional network traffic analysis tools do not provide dynamic modification of the behavior of the system at run-time. In addition, the selection of protocols that are analyzed is very limited (all or nothing) and the level/type of analysis detail is also very limited (all or nothing).

A need arises for a network traffic analysis tool that provides improved performance with modern, high performance networks and that provides flexibility in terms of the types and configurations of network traffic analysis that can be performed.

SUMMARY OF THE INVENTION

The present invention is a method and system for network traffic analysis that provides improved performance with modern, high performance networks and that provides flexibility in terms of the types and configurations of network traffic analysis that can be performed.

In one embodiment of the present invention, a system for network traffic analysis comprising a classification engine operable to parse received frames, each frame comprising a plurality of layers of protocols and each frame having a type corresponding to a highest layer protocol or network address of the frame, and to provide pre-analysis of the received frames to generate classification information on a flow-basis and on a per packet-basis, a filter processing engine operable to reduce the received frames based on a type of each frame indicated by the generated classification information to form information representing filtered frames and an analysis block operable to perform detailed analysis on layers of protocols of the filtered frames and generate objects representing the analysis.

In one aspect of the present invention, the filter processing engine is operable to reduce the received frames based on a type of each frame by passing only specified types of frames. The analysis block may be operable to perform detailed analysis on all layers of protocols of the filtered frames. The protocols may comprise at least one of Internet protocol, file transfer protocol, transmission control protocol, hypertext transmission protocol, post office protocol, user datagram protocol, remote procedure call protocol, or Ethernet protocol.

In one aspect of the present invention, the filter processing engine is operable to pass all types of frames. The analysis block may be operable to perform detailed analysis only on specified layers of protocols of the filtered frames. The protocols may comprise at least one of Internet protocol, file transfer protocol, transmission control protocol, hypertext transmission protocol, post office protocol, user datagram protocol, remote procedure call protocol, or Ethernet protocol.

In one aspect of the present invention, the filter processing engine is operable to reduce the received frames based on a type of each frame by passing only specified types of frames. The analysis block may be operable to perform detailed analysis only on specified layers of protocols of the filtered frames. The protocols may comprise at least one of Internet protocol, file transfer protocol, transmission control protocol, hypertext transmission protocol, post office protocol, user datagram protocol, remote procedure call protocol, or Ethernet protocol.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
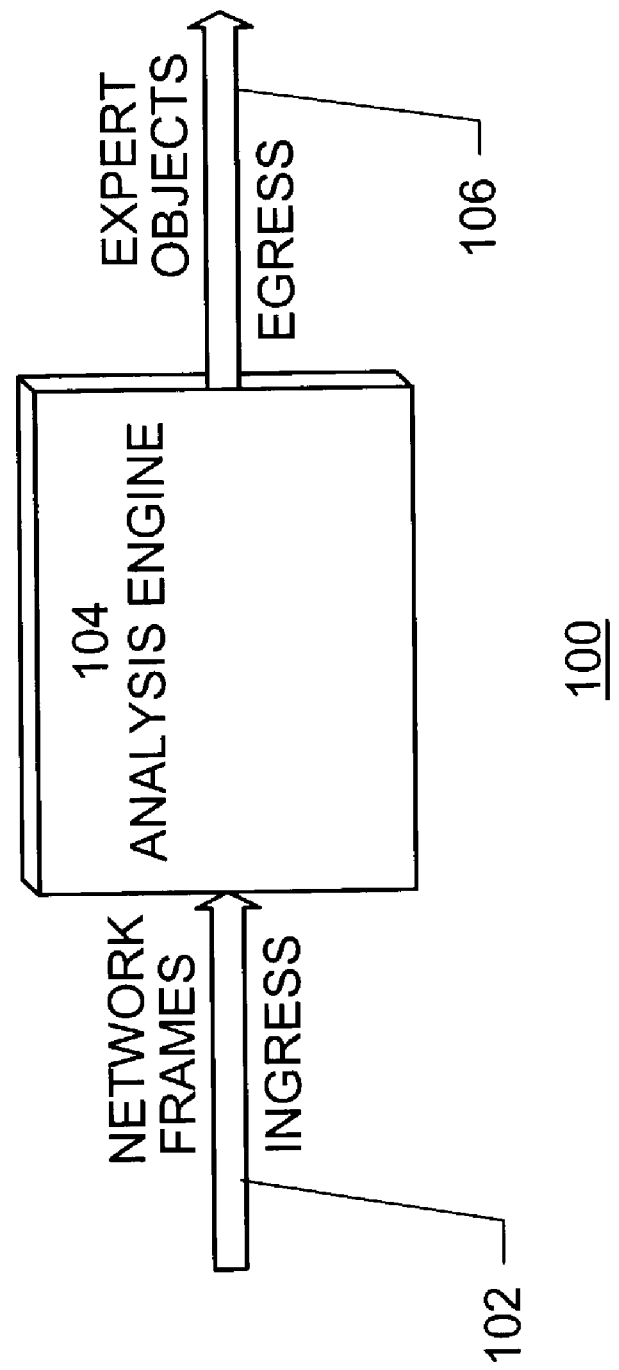
FIG. 1 is an exemplary dataflow diagram of one embodiment of the present invention.

The present invention is a system and method for performing network traffic analysis that provides data reduction and analysis of network frames. An exemplary dataflow diagram of one embodiment 100 of the present invention is shown in FIG. 1. In this typical situation, a multitude of frames 102 of network traffic enters at the ingress of analysis engine 104, which performs network traffic analysis on the input network frames. A reduced set of expert objects 106, which represent the analysis of the network frames, is output from the egress of network traffic analysis engine 104. In the classical Expert approach, the type of analysis would be statistics and diagnostics for a multitude of protocols.

The expert network traffic analysis system of the present invention provides a framework that is flexible, extensible, and scalable and provides the capability for the behavior to be adjusted by the user and/or the corresponding transient environment. For example, a client, which may include a user, an application, or another expert network traffic analysis system, may configure and adjust the behavior of the system in a variety of ways:

Protocols—the client can select the set of protocols to analyze and can add/modify/remove user customized protocols Network Addresses—the client can select the set of network addresses to analyze and can add/modify/ remove network addresses.

Level/Type of Analysis—the client can select the level/ type of analysis and can add/modify/remove user customized analysis.

Data Retrieval—the client can query the analysis data and receive responses to client queries that include analysis data.

Internal and External Events—allow events (external or internal) to modify the set of protocols and network addresses to analyze and the level/type of analysis. The client can select which events are to be enabled and the action(s) for these events, configure triggers, thresholds and alarms, and add/modify/remove user customized events Modes of Analysis—the client can select the modes of analysis and can add/modify/remove modes of analysis.

Configuration Profiles—Allow profiles to maintain the configuration of the engine: the set of protocols, the set of network addresses, the level/type of analysis, and the events enabled. The client can select a profile and can add/modify/remove profiles.

Figure 2:
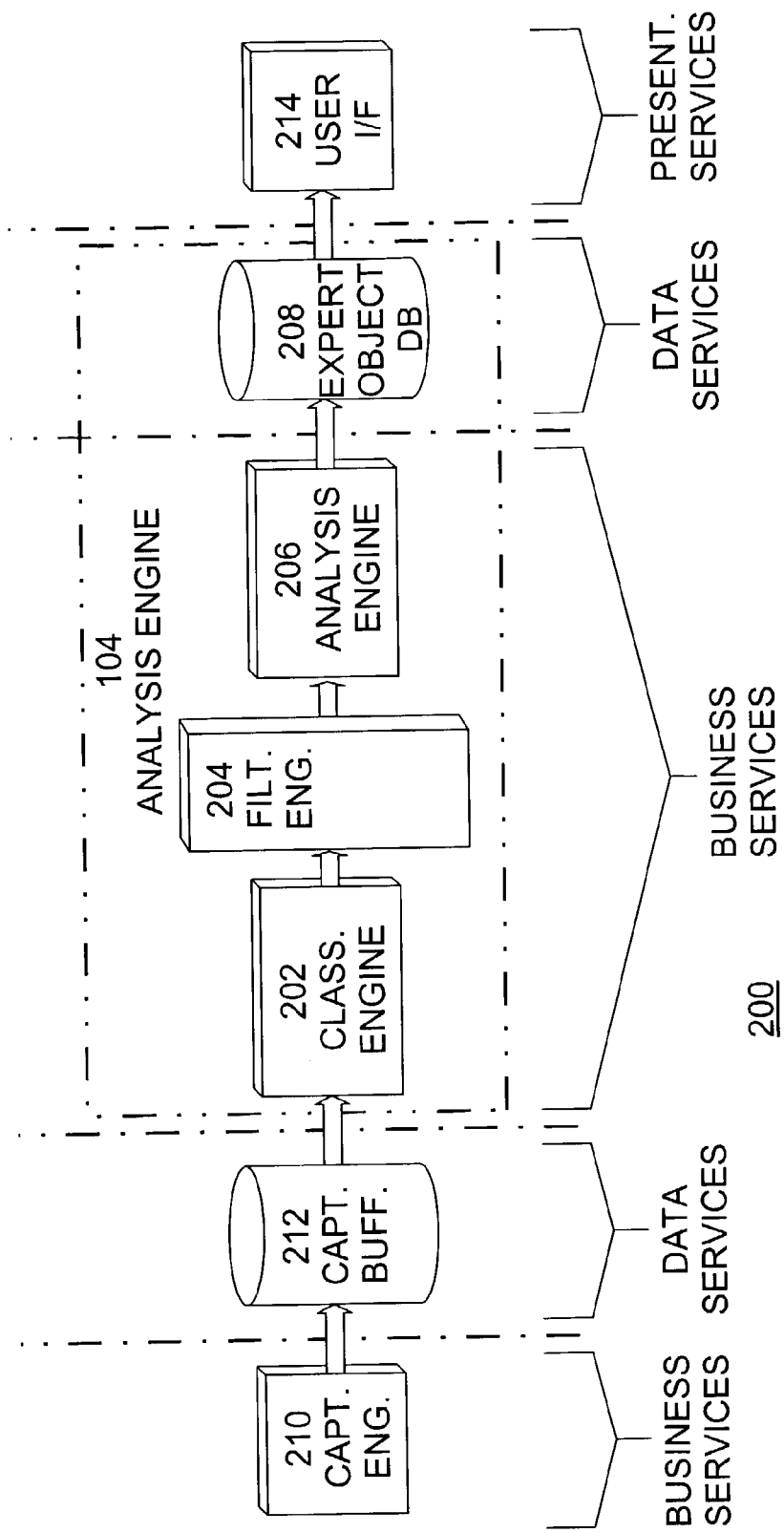
FIG. 2 is an exemplary block diagram of a system in which the present invention may be implemented.

An exemplary block diagram of a system 200 in which the present invention may be implemented is shown in FIG. 2. System 200 includes analysis engine 104, which includes classification engine 202, filter processing engine 204, analysis engine 206, and expert object database 208. Analysis engine 104 is preferably deployed in conjunction with a capture engine 210, capture buffer 212, and a user interface 214. Capture engine 210 captures network frames from a network interface. The captured frames are pushed into and temporarily stored in capture buffer 212. The interface to capture buffer 212 provides the input to analysis engine 104.

System 200 may be organized into a plurality of tiers, as shown in FIG. 2. Business Services Tier 216 includes the combination of the classification engine 202, filter processing engine 204, and analysis engine 206, as well as capture engine 210. The combination of these components provides the network traffic analysis functionality of system 200. Presentation services tier 218 includes the clients that interface to the engine, using a common client interface. A multitude of client applications can be developed for presentation services tier 218. Data services tier 220 includes Expert Object Database 208. Data services tier 220 provides the means for object retrieval by both the client and the analysis engine 208. Analysis engine 104 includes the business services tier and the data services tier as depicted in the above diagram. The client (through the data services tier 220) can only retrieve records (Expert objects) from the expert object database 208. The adding, modifying or deleting of records is performed by analysis engine 206. Essentially, analysis engine 206 fills up the database and the clients can retrieve the data through data services tier 220.

Figure 3:
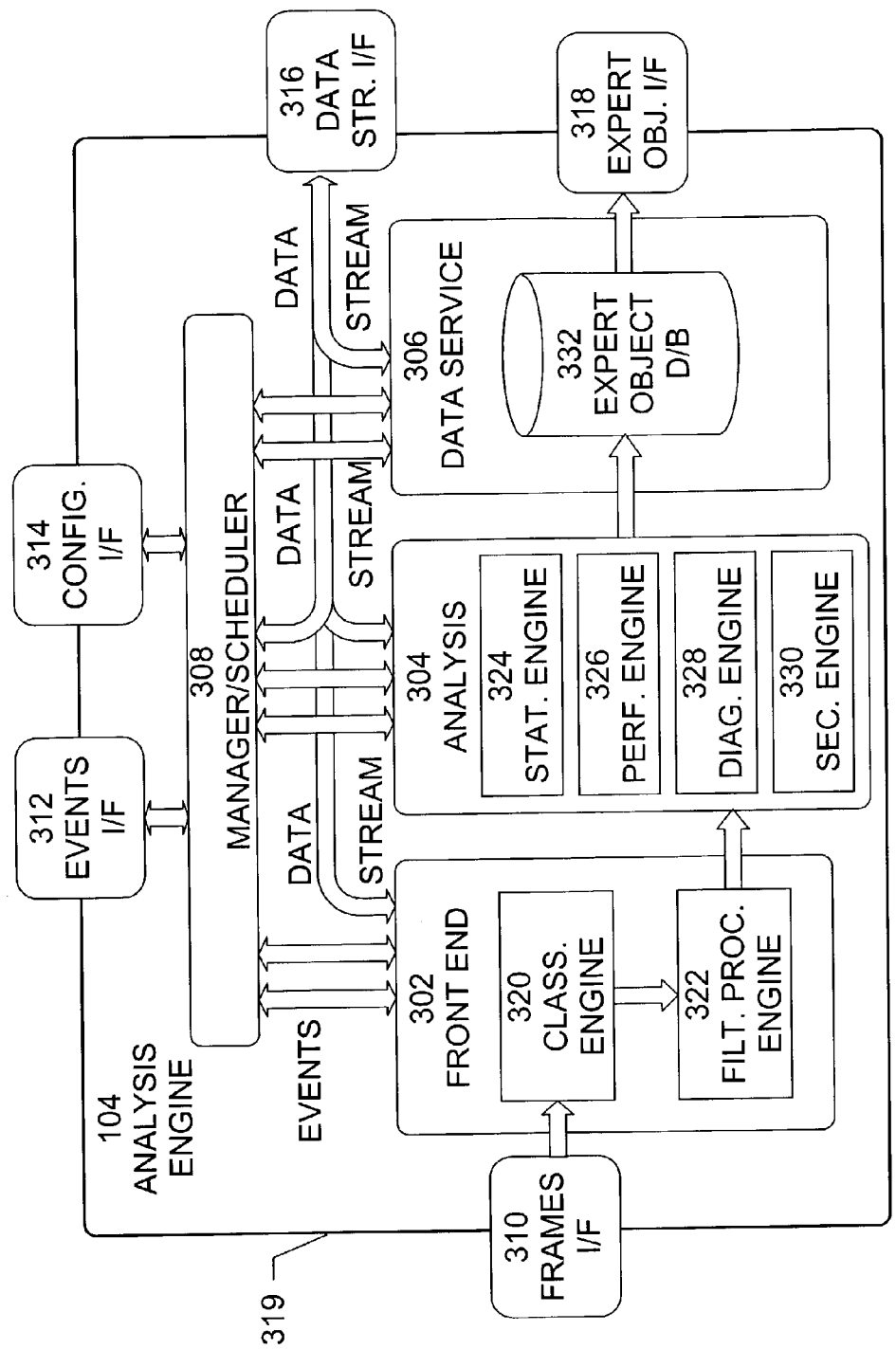
FIG. 3 is an exemplary block diagram of the architecture of an analysis engine shown in FIG. 2.

An exemplary block diagram of the architecture of analysis engine 104 is shown in FIG. 3. Analysis engine 104 includes front end block 302, analysis block 304, data services block 306, manager/scheduler 308, and a plurality of interfaces—frames interface 310, events interface 312, configuration interface 314, data stream interface 316, and expert object interface 318. In addition, analysis engine 104 is contained by wrapper 319. Front end block 302 represents the ingress of analysis engine 104, where the network frames enter the system. The network frames can be a set of frames streamed from a data source or a set of frames captured by a capture engine 210, shown in FIG. 2. Front end block 302 includes classification engine 320 and filter processing engine 322. Classification engine 320 parses the received frames and provides classification on a flow-basis and on a per packet-basis. Filter processing engine 322 reduces the set of frames that have entered the system based on the classification information from classification engine 320 and focuses on a set of conversations. Filters are based on protocols, network addresses and protocol dependent information.

Classification engine 320 provides pre-analysis of the frames. Pre-analysis includes processing such as de-multiplexing the protocols of the frame, deriving stateful information on the frame, and building a model of the flows representing the network objects defined in the set of frames. With the pre-analysis of the frame, the filter engine can filter frames (include/exclude) on specific protocols and/or network addresses defined in the frame, thus providing a filtered set of frames to be posted to analysis engine 104. In particular, classification engine 320:

- Processes contiguous and non-contiguous sets of frames
- Provides flow-based classification: Creates/maintains/deletes flow records based on the set of frames. The flow record should contain stateful information for the conversation derived from the set of frames.
- Provides packet-based classification: Creates and appends descriptors to each of the frames in the set. The descriptor should contain the de-multiplex of the protocols in the frames and any stateful information of the frame.
- Notifies filter processing engine 322 that frames/flow records are available for processing.

Filter processing engine 322 provides the means of discarding frames, which will reduce the set of frames analyzed (posted to analysis block 304). The basis of discarding may result from the combination of the set of protocols enabled/disabled, the set of network addresses included/excluded or any protocol specific filtering that may be required. In particular, filter processing engine 322:

- Configures/maintains/modifies the set of protocols/network addresses.
- Responds to notifications by classification engine 320 that frames/flow records are available for processing.
- Examines frames/flow records for the enabled protocols/network addresses.
- Examines frames/flow records for the protocol dependent information.
- Provides adaptive filtering based on system state and condition.
- Discards uninteresting frames from the set of frames presented by classification engine 320.
- Notifies analysis block 304 that frames/flow records are available for processing.

Analysis block 304 performs detailed analysis on the contents of the filtered frames, which are delivered in the form of frames/flow records posted by filter processing engine 322. A number of different types of analysis and granularities of analysis may be carried out. Analysis block 304 creates network/flow objects based on the analysis. Analysis block 304 includes a number of specific analysis processing components as defined by the packages, modes and profiles. For example, analysis block 304 may include statistics engine 324, performance engine 226, diagnostics engine 328, security engine 330, and may include other types of analysis processing engines. In particular, analysis block 304:

- Configures/maintains/upgrades the packages registered.
- Configures/maintains the active analysis components on a per mode basis.
- Examines frames/flow records with the list of components in the active analysis components.
- Allows pass-through of flows (simple transformations of flows to Expert objects to provide the user the knowledge of what exists in the network but has not been analyzed).
- Requests Expert objects from the data exchange services
- Updates Expert objects with the analysis information produced by the components.

Data services block 306 includes expert object database 332, which is a repository for the objects created. Data services block 306 provides short-term persistence of the data objects that are created, and maintains the integrity of this data. In addition, data services block 306 provides the capability for the stored data to be retrieved by a multitude of clients. In particular, data services block 306:

- Creates/retrieves/deletes Expert objects based on requests from analysis block 304 and the current state of expert objects database 332.
- Provides a configurable length of short-term persistence for Expert objects.
- Establishes/maintains/disconnects sessions with clients to expert objects database 332.
- Creates result sets based on the expert objects stored in expert objects database 332 and the queries requested by the client.

Manager/Scheduler 308 provides the configuration capability of the system and the coordination/interfacing of components within the system and components external to the system. In particular, manager/scheduler 308:

- Configures/maintains the configuration of the system (profiles, engine mode, analysis mode, events, analysis, alarms, triggers, thresholds, data sources, interfaces).
- Configures/upgrades the components in the system (classification engine, filter processing engine, analysis engine, data exchange services, packages, interfaces)
- Issues/processes/prioritizes events and routes them to registered components.
- Maintains a system real-time clock/provides services for timing (scheduling, timers, etc.).
- Provides a mechanism for long-term persistence through serializing objects (frames, flow records, events, configuration, Expert objects) to the data sources configured.

Wrapper 319 and interfaces 310–318 provide encapsulation of the components of analysis engine 104. This encapsulation allows the system to be repackaged with new components without impacting external components. With well defined wrappers and interfaces, the components of the system can be replaced or enhanced with existing 3rd party/off-the-shelf components. For example, classification engine 320 can be replaced by components that are defined for IntServ or Diff-Serv architectures. Expert object database 332 can be replaced with an off-the-shelf object database.

Frames interface 310 provides analysis engine 104 with a means to connect to a capture buffer and retrieve the frames from the buffer. Frames interface 310 can also provide a means to monitor the status of the capture buffer, or to provide the status of the engine to the capture engine. Methods supported by frames interface 310 include:

- GetFrames: This method allows analysis engine 104 to retrieve frames from the capture buffer.
- RemoveFrames: This method allows analysis engine 104 to remove frames from the capture buffer.
- GetFrameBufferStatus: This method allows analysis engine 104 to get the status of the capture buffer.
- GetEngineStatus: This method allows the capture engine to retrieve the status of analysis engine 104.

Events interface 312 allows analysis engine 104 to issue and process events. Events received by analysis engine 104 and processed are events that are registered in the system. Without registration, the events received will be dropped. Methods supported by events interface 312 include:

- IssueEvent: This method allows the engine to issue events
- ProcessEvent: This method allows the engine to process events generated externally.

Configuration interface 314 provides the user of analysis engine 104 with the capability to configure analysis engine 104, the protocols, the network addresses, the profiles, the modes, the data stream, the events, and the sessions. To further break-down the functionality of the interface, the configuration interface can be divided into several sub-interfaces.

Engine Configuration

The engine sub-interface initializes/configures the components within the system (to add/modify (upgrade)/remove the components (or packages)) and the behavior of the system. Methods supported include:

InitializeEngine: This method allows the user to initialize the engine, which may include the protocols to analyze (and the type of analysis), the profile to load, the mode to set, the data stream to configure, the network addresses to monitor (or exclude), and the events to enable.

ConfigureEngine: This method allows the user a means to upgrade/modify/add components to the engine. It allows the engine's components to be modified (whether it is a new/updated/removed component).

GetEngineStatus: This method allows the user to get the status of the engine. This can include the currently loaded profile, the mode enabled, the protocol set enabled, the level/type of analysis on the protocol set and basic statistics collected on the engine (# of frames analyzed, etc.).

Protocol Configuration

The protocol sub-interface configures the protocols and the components that analyze the protocols (statistics, performance, diagnostics, thresholds, security, triggers, alarms, etc.). Methods supported include:

ConfigureProtocol: This method allows the user to add/modify/remove/enable/disable protocols and the level/type of analysis performed on the protocols.

GetProtocolStatus: This method allows the user to get the status of the protocols and the level/type of analysis performed on those protocols.

Network Address Configuration

The network address sub-interface configures the network addresses monitored by the system. Network addresses are dependent on the type of network topology (medium and sub-medium) that the system is deployed in. Methods supported include:

ConfigureNetworkAddress: This method allows the user to add/modify/remove/include/exclude network address monitored by the engine.

GetNetworkAddressStatus: This method allows the user to get the status of the network addresses configured.

Event Configuration

The event sub-interface configures the events that are enabled by the system. Events can be generated by protocol-level triggers or alarms, or by system-level triggers or alarms. Methods supported include:

ConfigureEvent: This method allows the user to add/modify/remove/enable/disable events, triggers, alarms and thresholds, and register the events with the appropriate components.

GetEventStatus: This method allows the user to get the status of the events, triggers, thresholds and alarms, whether the events are enabled or not.

Data Stream Configuration

The data stream sub-interface configures the data sources for input or output. It provides the capability of setting paths to the data sources, data content, and read/write properties. Methods supported include:

ConfigureDataStream: This method allows the user to set/modify the data stream input and output data sources.

GetDataStreamStatus: This method allows the user to get the status of the input and output data stream.

Modes Configuration

The modes sub-interface configures the modes to be used by the system. It provides the capability to configure what type of information can be transferred from one mode to another. Methods supported include:

ConfigureMode: This method allows the user to add/modify/delete the modes.

GetModeStatus: This method allows the user to get the status of the configured modes.

Profile Configuration

The profile sub-interface configures the profiles to be used by the system. Once the system has been configured to a particular behavior (protocols enabled, level/type of analysis, modes, etc.), the user can save the configuration into a profile. Methods supported include:

ConfigureProfile: This method allows the user to load/save/modify/delete the profile.

GetProfileStatus: This method allows the user to get the status of the loaded/saved profiles.

Sessions Configuration

The sessions sub-interface provides the user with the capability to establish a session with the engine. It can configure the session to poll (push) data to a particular device at a particular rate. Methods supported include:

ConfigureSession: This method allows the user establish/disconnect a session with the engine.

GetSessionsStatus: This method allows the user to get the status of sessions established.

Data stream interface 316 provides long-term persistence of configuration, events, and frames and objects that is independent from the devices that are involved. The data stream is a buffered stream to ensure that the actual data transfer between memory and external devices is efficient. It provides long-term persistence for objects, and a means to retrieve them. The type of objects can consist of configuration, events, expert objects, alarms, frames, flow records, etc. Methods supported by data stream interface 316 include:

ReadData: This method allow the engine to read data from a data source.

WriteData: This method allows the engine to write data to a data source.

Expert objects interface 318 provides the capability to serve many clients. When a session has been established, the query from the user of the session will be served with a response generated from the Expert object database. Methods supported by expert objects interface 318 include:

GetExpertObjects: This method allow the user to query the Expert object database. In response to a query is a result set with the information requested.

The behavior of analysis engine 104 is determined by the type of output produced from the analysis of network frames. The output and thus the behavior is defined by the protocols analyzed, the level and type of analysis, and the inclusion or exclusion of network addresses. These attributes are constraints to the system, which can be adjusted dynamically to suit the needs of the user and to adapt to the network environment. The network addresses configured are dependent on the network topology (medium and sub-medium), whether the network is an ATM network, WAN or a LAN. The protocols analyzed and the type of analysis performed on the analyzed protocols can be defined by packages.

Figure 4:
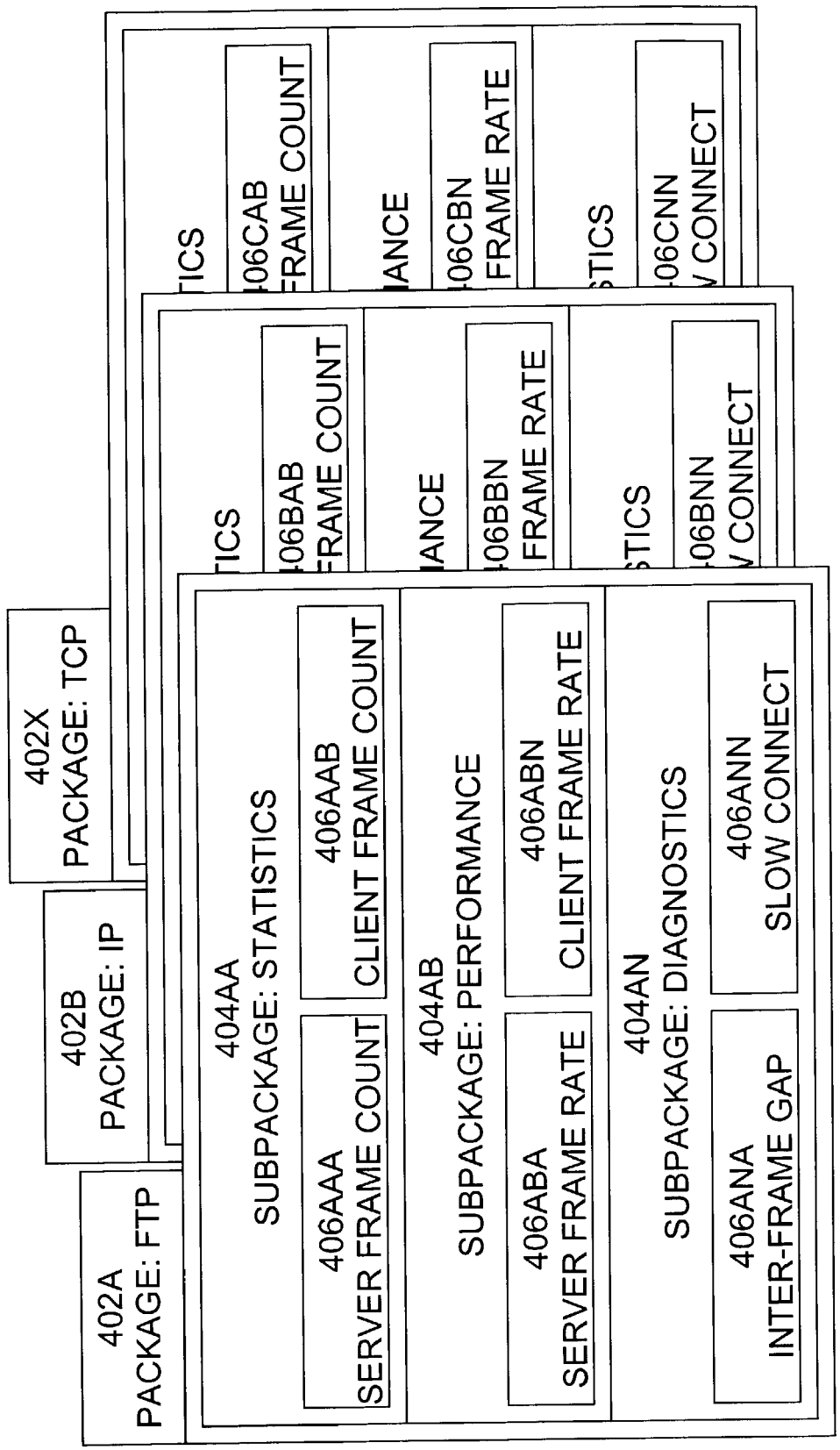
FIG. 4 is an exemplary diagram of a plurality of packages utilized by the analysis engine shown in FIG. 2.

An exemplary block diagram of a plurality of packages that may be used by analysis engine 104 is shown in FIG. 4. A package defines a library for a given protocol. The contents of the package (library) are the types of analysis that can be performed on a given protocol. The types of analysis can be classified into sub-packages: statistics derivation, performance, diagnostics, security, and/or other defined categories. Each type of analysis is defined as a component. Thus, a package may be defined as a library of components for a given protocol. A package basically defines what type of behavior (analysis) is possible for a given protocol.

For example, in FIG. 4, examples of packages for the file transfer protocol (FTP), package 402A, Internet protocol (IP), package 402B, and transmission control protocol (TCP), package 402X, are shown. Each package includes one or more subpackages, each of which includes one or more components. For example, package 402A includes subpackages 404AA-AN and subpackage 404AA includes components 406AAA and 406AAB. A package defines a module that contains a protocol and the type of analysis (statistics, performance, diagnostics, thresholds, security, alarms, triggers, etc.) performed on the protocol. Each component defines one particular type of analysis performed on the protocol. Components can be added, modified, and removed from a package. Packages can be combined to form suites of packages encompassing a set of protocols. Components may be added to an existing package and custom packages may be created by users. For a user to use a package, the package must be registered. Once the package is registered, the user has the capability to enable or disable each component in the package in order to control the protocols that are analyzed and/or the types of analysis that are performed. When a component is enabled, the system will activate the component and maintain it within an active analysis table based on the protocol. When a system analyzes a frame, the system will iterate through all the active components. The active analysis table provides a means to reduce the amount of analysis that is performed on a network frame at run-time. The analysis performed on a network frame is dependent on the components listed in the active analysis table. If the user wants to enable a particular analysis, the system will add the component to the active analysis table.

A plurality of packages can be combined to form suites of packages. A suite of packages defines the type of behavior possible for a set of protocols. All the suites in the system define the types of behavior possible for the entire system. The components can either be independent or they can be dependent on other components within or outside of the package, thus forming dependencies between packages.

The package and its components allows the system to have a granularity of analysis, in which a user can enable or disable entire packages or just the components within a package. In addition, granularity of analysis provides the capability to add, modify, and remove analysis for any given protocol. The components in a package relating to a protocol define all the possible types of analysis that may be performed on the protocol. The package also provides a hierarchy of analysis types where the types of analysis can be classified into categories of specific behavior, such as statistics, performance, diagnostics, security, etc.

Figure 5:
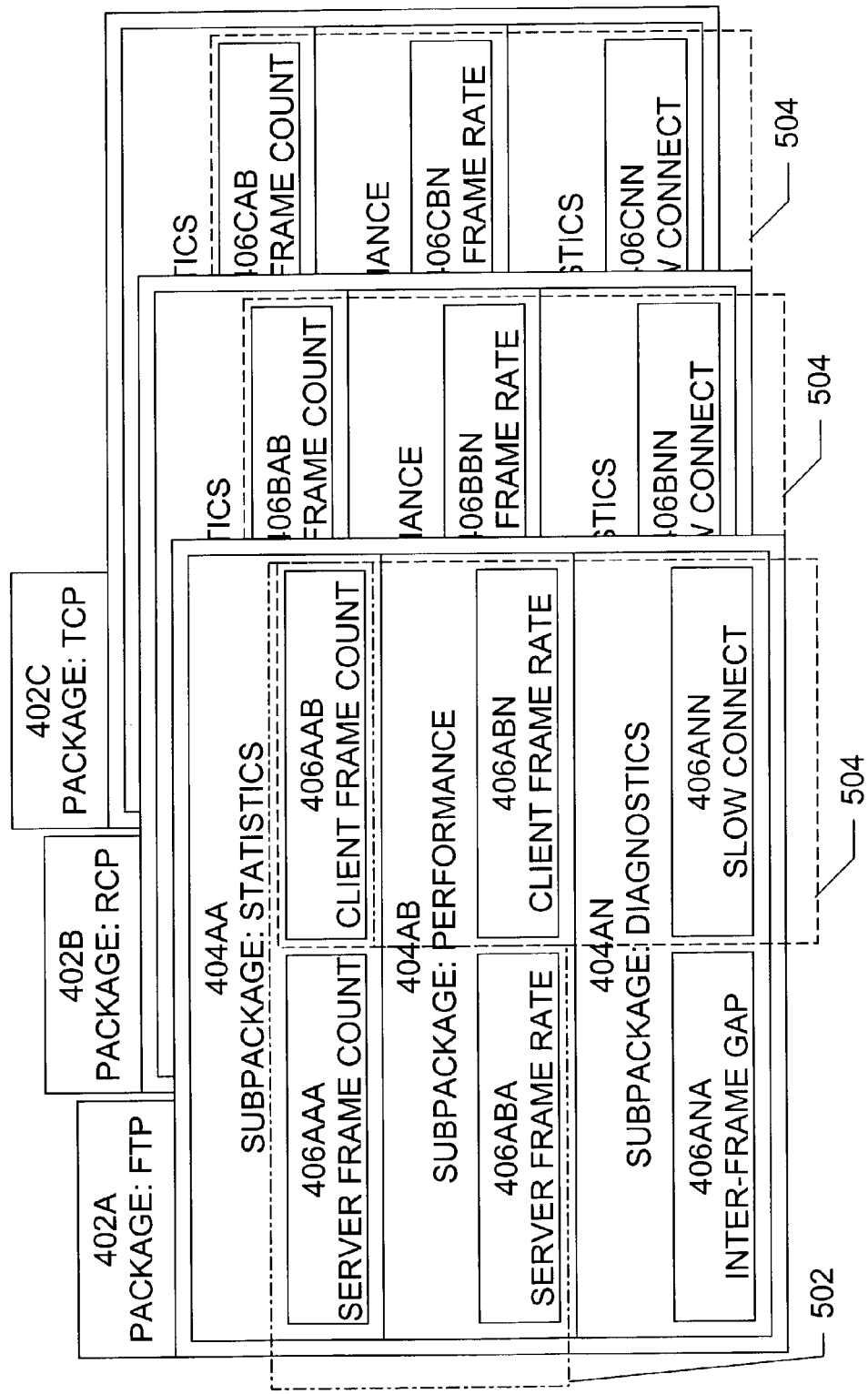
FIG. 5 is an exemplary block diagram of a plurality of modes that may be defined for use by the analysis engine shown in FIG. 2.

An exemplary block diagram of a plurality of modes that may be defined for use by analysis engine 104 is shown in FIG. 5. A mode defines a set of components enabled for a set of protocols. For example, mode 502 includes components package 402A, while mode 504 includes components in packages 402A, 402B, and 402C. A mode provides an abstraction from the hierarchy presented by packages. While packages are static representations of the possible types of analysis, such as where the analysis is classified by statistics, performance and diagnostics, modes allow the dynamic grouping of analysis to provide a specific level of detail across many packages. A mode basically defines and groups a level of behavior (analysis) across a set of packages.

A single mode can be set at any time. And the transition of modes can be triggered by an event or manually set by the user. When an active mode transitions to a pending mode, some analysis information can be transferred to the pending mode (protocols enabled, network addresses configured, events enabled, etc.). Modes allow the user a different mechanism for grouping/classifying components. While packages group/classify components by type (statistics, performance, diagnostics, security) for a given protocol, modes group/classify components by level of detail (discovery, monitor, focus, diagnostic) for a set of protocols. Through each transition of modes, the level of detail should change. The advantage of introducing modes is to allow the system to focus on symptoms that have been discovered and provide fault isolation on these symptoms.

In a preferred embodiment, the system has four default modes of analysis: discovery, monitor, focus and diagnostic. Each mode provides different levels of details for a set of protocols. The user has the capability to add, modify, and remove modes defined in the system and to add and remove types of analysis from a mode.

Discovery Mode: Provide means for creating a protocol directory tree and simple statistics.

Monitor Mode: Provide statistics, performance and general anomalies.

Focus Mode: Provide statistics, performance and diagnostics.

Diagnostic Mode: Provide statistics, performance, diagnostics and fault isolation.

Modes allow the system to focus on particular symptoms that have occurred for protocols and network addresses and provide some form of fault isolation. An example of mode transitions:

Given that the system is in monitoring mode for several protocols (HTTP, FTP, Oracle), a slow response time is triggered for HTTP (which means the response time calculated has crossed the threshold for HTTP response times). The action for this trigger is to transition from monitoring mode to diagnostic mode (with analysis performed on all the layers defined for the conversation where the symptom occurred).

Figure 6:
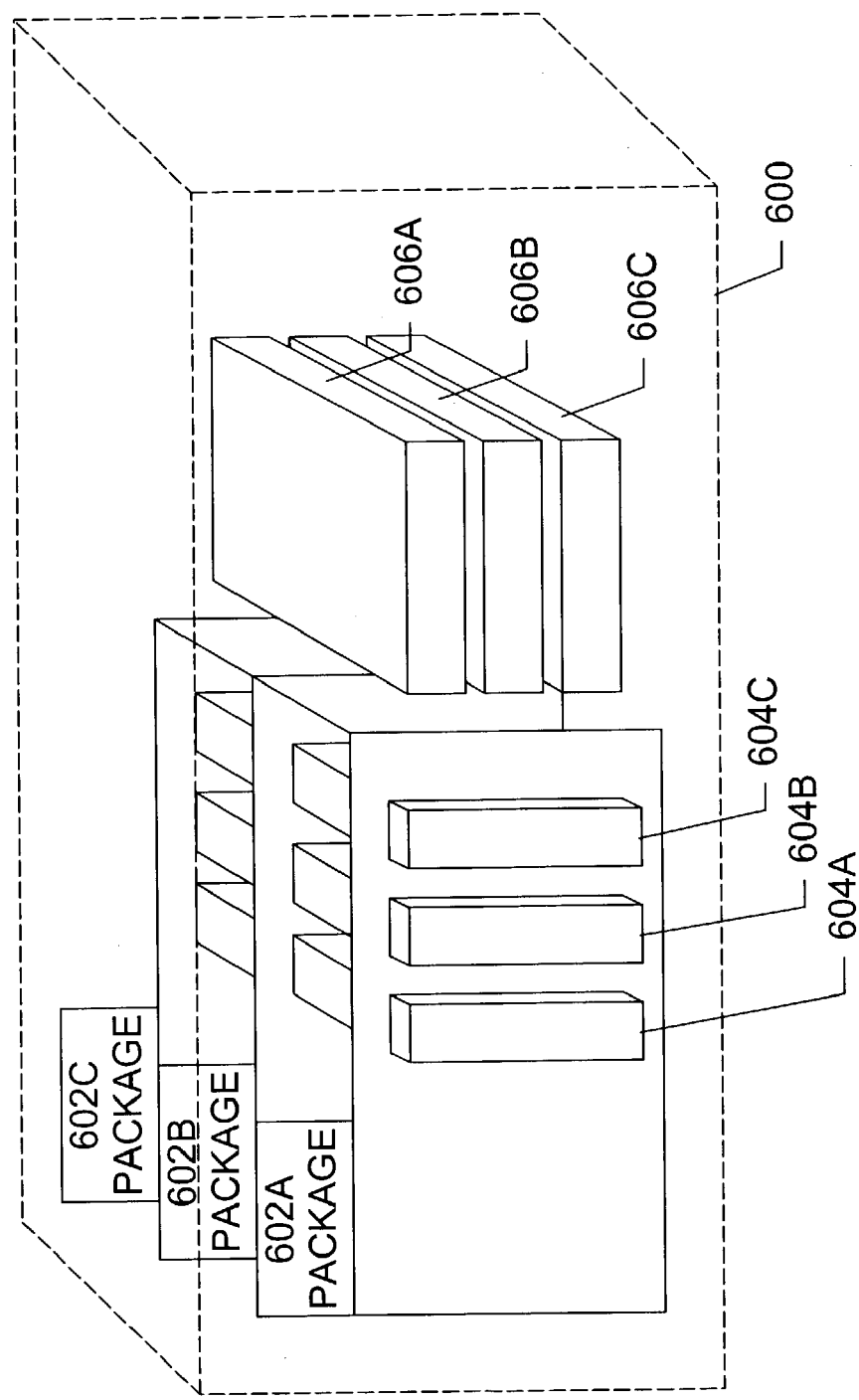
FIG. 6 is an exemplary block diagram of a profile that may be defined for use by the analysis engine shown in FIG. 2.

An exemplary block diagram of a profile 600 that may be defined for use by analysis engine 104 is shown in FIG. 6. Profiles provide a means of maintaining the configuration of the system and thus the analysis state and the system state of the system. Profiles provide a means of grouping packages, modes, sets of protocols, and sets of network addresses into a collection. This collection includes the protocols enabled, the type of analysis, the network addresses configured, the events enabled, and the modes configured. In the example shown in FIG. 6, profile 600 includes packages 602A–C, modes 604A–C, and types of analysis 606A–C.

The profiles can be added, modified, and removed from the system. A single profile can be loaded at any time. And the changing of profiles can be triggered by an event or manually loaded by the user. When an active profile transitions to a pending profile, some analysis information can be transferred to the pending profile (protocols enabled, network addresses configured, events enabled, etc.). A profile basically defines a particular system behavior.

Profiles integrate the packages that have been registered in the system with the behavior selected from the packages by the user. With defined profiles, the system can iterate through the profiles to modify the behavior of the system with respect to events, conditions, the types of analysis and modes configured.

Three entities have been defined: packages, modes and profiles. Each of the entities provides a different mechanism for grouping sets of analysis and thus providing different granularities of behavior. With an event-driven system, the behavior of the system can dynamically change with respect to a sequence of events.

Packages: A set of packages answers the question what can the system possibly do. It is a static representation of behavior (Potential Behavior).

Modes: A mode answers the question what is the system doing at a given time (now/next) with a given stimulus. It is a dynamic representation of behavior (Kinetic Behavior).

Profiles: Profiles integrate the Potential & Kinetic Behavior into a collection of behaviors.

Each of the entities provides a distinctive way of grouping behavior/capability thus providing a clear mechanism for managing the analysis capability sets.

A package represents a given protocol. A component within the package defines what analysis capability can be performed on the given protocol. A group of packages represents a set of protocols. Packages can be divided into sub-packages representing a particular data type: statistics, performance, diagnostics, security, etc.

A mode represents the grouping of components across the set of packages (protocols). The grouping of components provides a certain level of detail that can be presented to the user at a given time.

Figure 7:
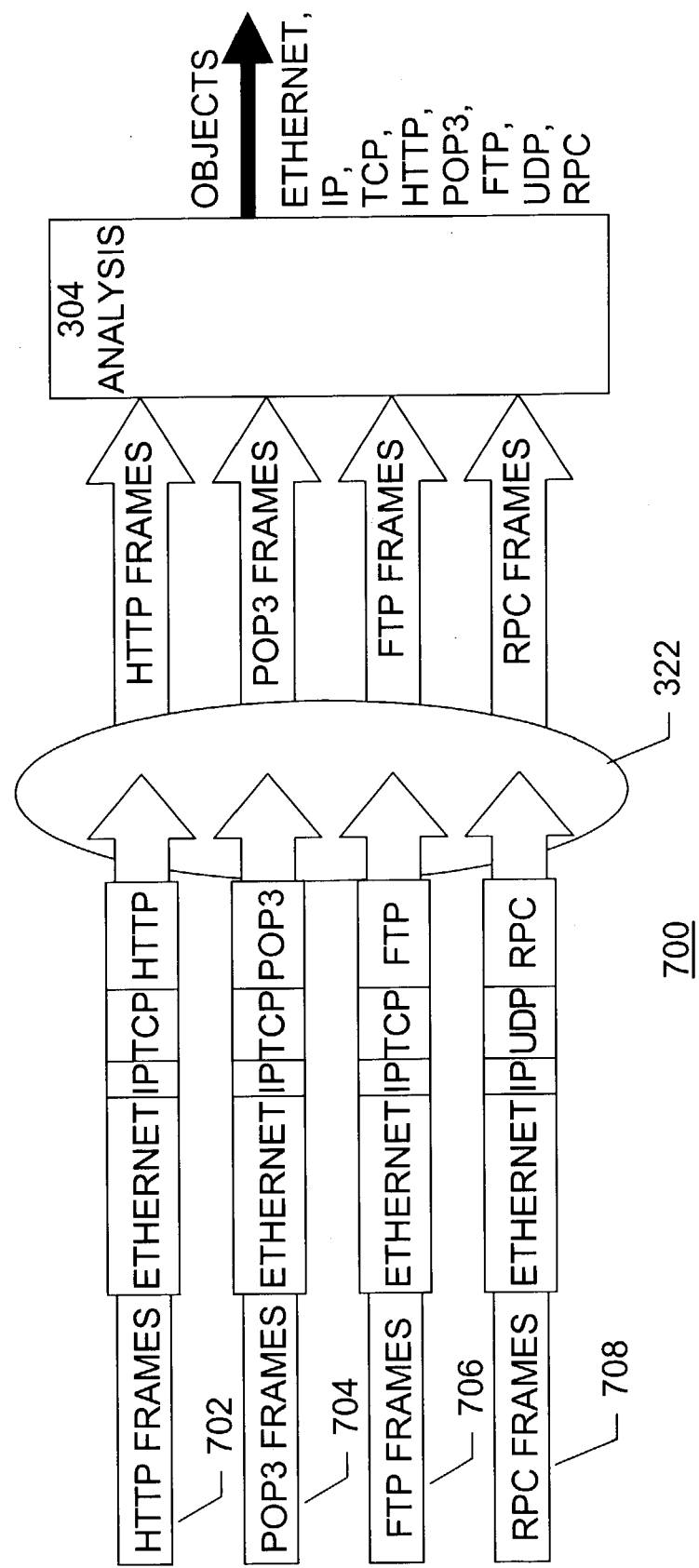
FIG. 7 is an exemplary data flow diagram of analysis that may be performed by the analysis engine shown in FIG. 2.

Analysis engine 104 can be configured in essentially three ways: filtered analysis, reduced analysis and the combination of the two (filtered-reduced analysis). An exemplary data flow diagram of analysis performed by analysis engine 104 is shown in FIG. 7. As shown in FIG. 7, a plurality of types of frames are input to filter processing engine 322. Filtered analysis is provided by configuring filter processing engine 322 with the protocols/network addresses of interest. In the example shown in FIG. 7, HyperText Transfer Protocol (HTTP) frames 702, Post Office Protocol 3 (POP3) frames 704, File Transfer Protocol (FTP) frames 706, and Remote Procedure Call (RPC) frames 708 are input to filter processing engine 322. Each frame includes a number of layers of protocols. For example, HTTP frames 702 include Ethernet, Internet Protocol (IP), Transmission Control Protocol (TCP), and HTTP layers, POP3 frames include Ethernet, IP, TCP, and POP3 layers, FTP frames include Ethernet, IP, TCP, and FTP layers, and RPC frames include Ethernet, IP, UDP, and RPC layers.

Filter processing engine 322 can be configured to pass or exclude desired types of frames. The frames passed by filter processing engine 322 are input to analysis block 304.

Filtered analysis provides the capability to reduce the amount of frames that are to be analyzed. It is provided by configuring the filter processing engine with the protocols, network addresses of interest, and protocol dependent information. Analysis block 304 can be configured to analyze only specified layers of the input frames. This reduced analysis provides the capability to reduce the amount of analysis on a per frame basis. It is provided by configuring the analysis engine with the type of analysis to be performed. If filter processing engine 322 is configured to pass all types of frames and analysis block 304 is set to analyze all layers, then the output expert objects 710 include expert objects representing every layer of every frame type that is input to analysis engine 104. In the example shown in FIG. 7, expert objects 710 representing Ethernet, IP, TCP, HTTP, POP3, FTP, User Datagram Protocol (UDP), and RPC layers are output from analysis block 304.

Figure 8:
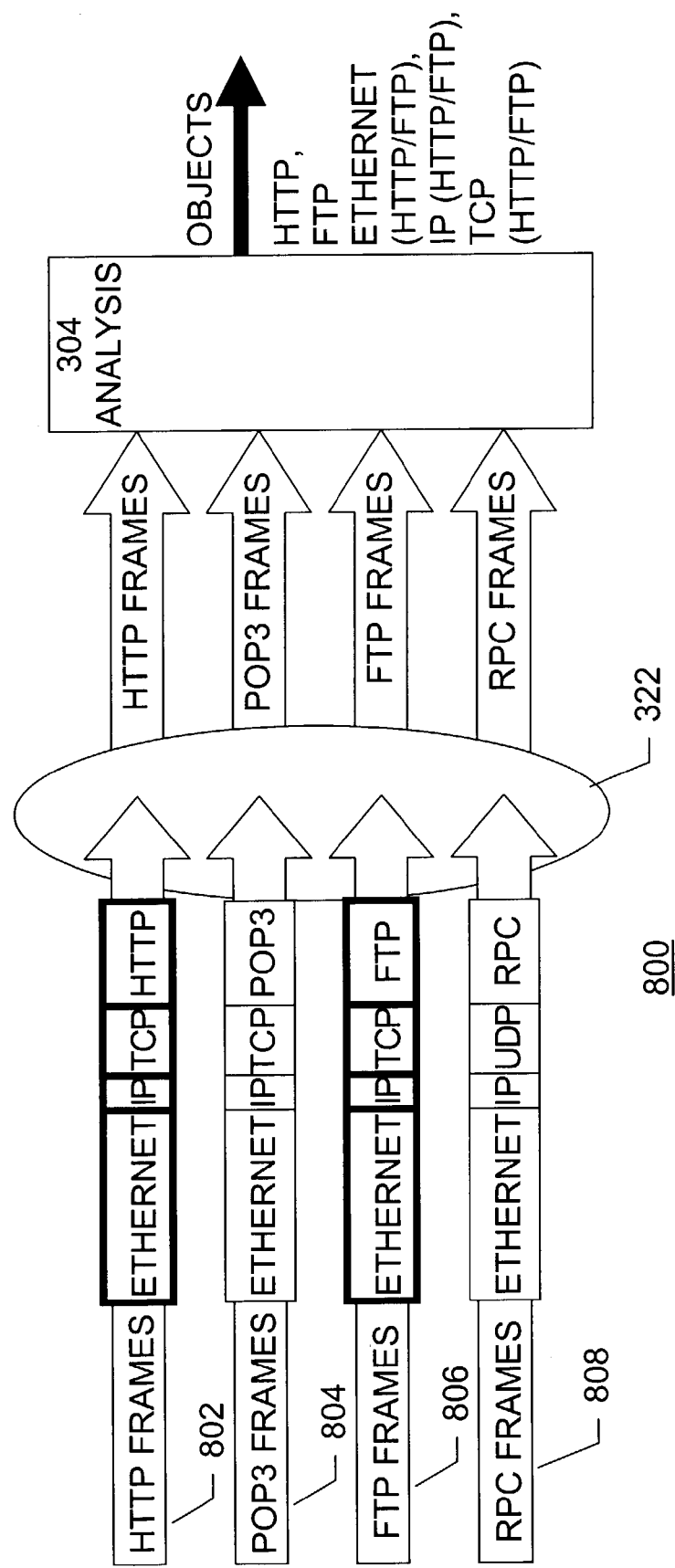
FIG. 8 is an exemplary data flow diagram of analysis that may be performed by the analysis engine shown in FIG. 2.

In order to perform filtered analysis, filter processing engine 322 is configured with a filter set, for example, to pass only specified types of frames and analysis block 304 is configured to analyze all layers. An exemplary data flow diagram of filtered analysis is shown in FIG. 8. HTTP frames 802, POP3 frames 804, FTP frames 806, and RPC frames 808 are input to filter processing engine 322. Each frame includes a number of layers of protocols. For example, HTTP frames 802 include Ethernet, Internet Protocol (IP), Transmission Control Protocol (TCP), and HTTP layers, POP3 frames include Ethernet, IP, TCP, and POP3 layers, FTP frames include Ethernet, IP, TCP, and FTP layers, and RPC frames include Ethernet, IP, UDP, and RPC layers.

In the example shown in FIG. 8, filter processing engine 322 is configured to pass only HTTP and FTP frames and analysis block 304 is configured to analyze all layers. The only types of frame that are passed to analysis block 304 are HTTP frames 802 and FTP frames 806. The output expert objects 810 include only HTTP and FTP layers, and Ethernet, IP, and TCP layers only for those frames that contain either HTTP or FTP layers.

Figure 9:
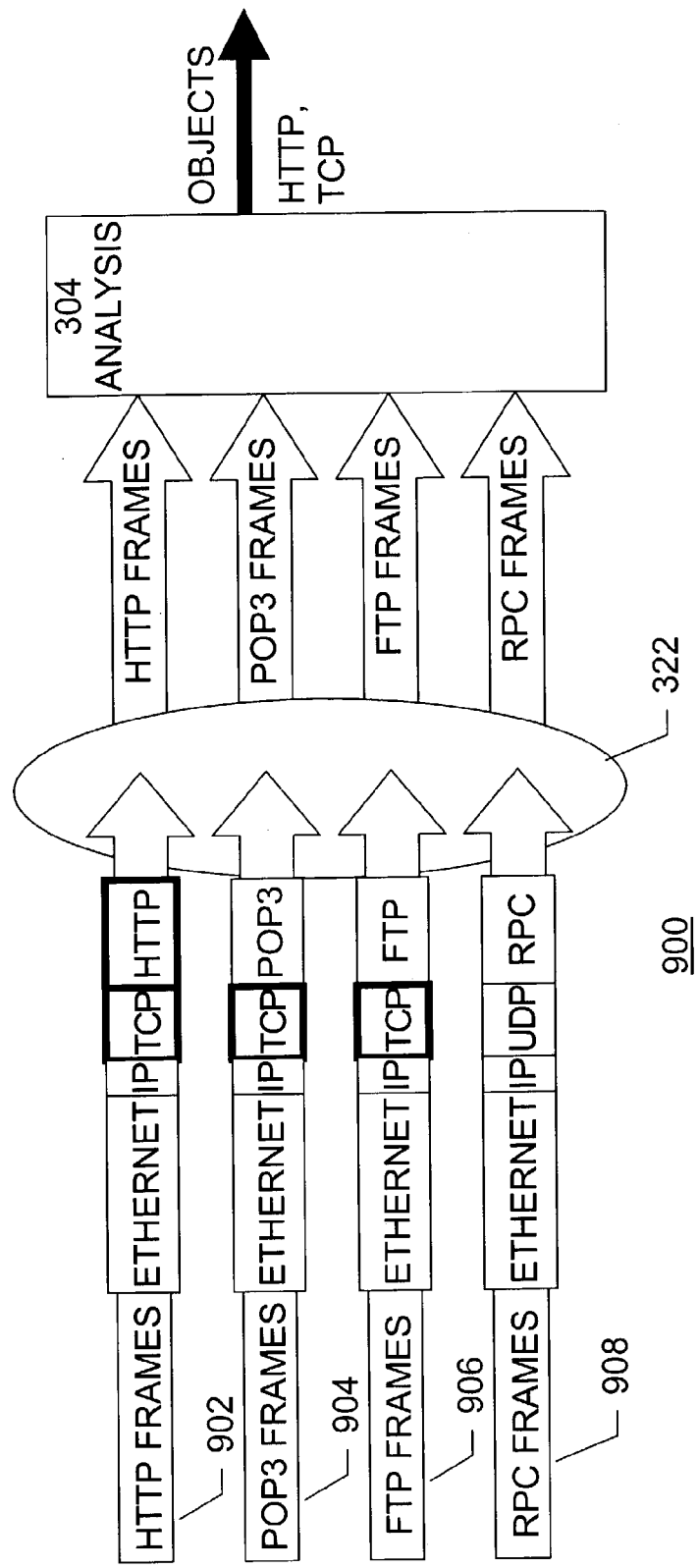
FIG. 9 is an exemplary data flow diagram of analysis that may be performed by the analysis engine shown in FIG. 2.

In order to perform reduced analysis, filter processing engine 322 is configured to pass all types of frames and analysis block 304 is configured to analyze only specified layers. An exemplary data flow diagram of filtered analysis is shown in FIG. 9. HTTP frames 902, POP3 frames 904, FTP frames 906, and RPC frames 908 are input to filter processing engine 322. Each frame includes a number of layers of protocols. For example, HTTP frames 902 include Ethernet, Internet Protocol (IP), Transmission Control Protocol (TCP), and HTTP layers, POP3 frames include Ethernet, IP, TCP, and POP3 layers, FTP frames include Ethernet, IP, TCP, and FTP layers, and RPC frames include Ethernet, IP, UDP, and RPC layers.

In the example shown in FIG. 9, filter processing engine 322 is configured to pass all types of frames and analysis block 304 is configured to analyze only HTTP and TCP layers. All types of frames (HTTP, POP3, FTP, and RPC) are passed to analysis block 304. Analysis block 304 only analyzes HTTP and TCP layers included in the frames. The output expert objects 910 include only HTTP and TCP layers.

Figure 10:
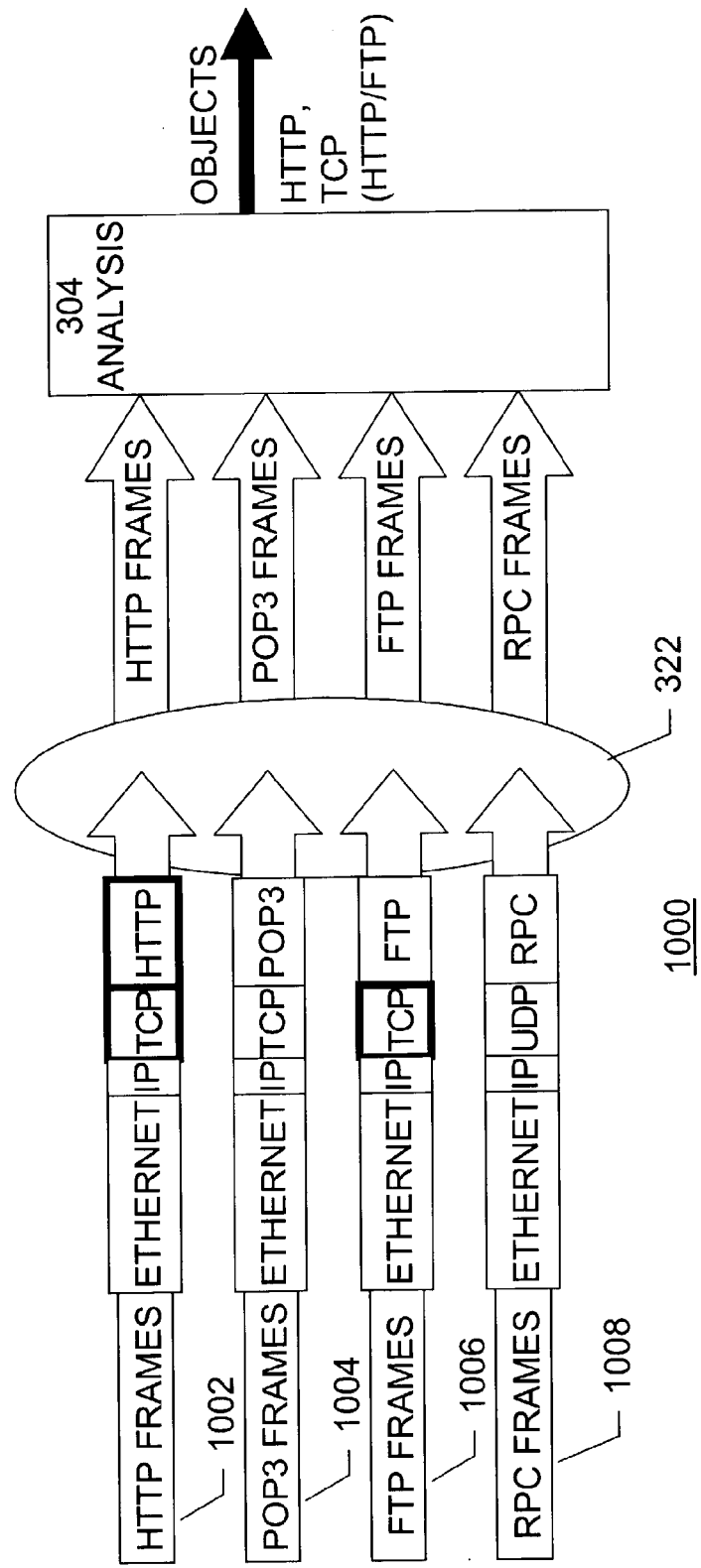
FIG. 10 is an exemplary data flow diagram of analysis that may be performed by the analysis engine shown in FIG. 2.

In order to perform filtered-reduced analysis, filter processing engine 322 is configured to pass only specified types of frames and analysis block 304 is configured to analyze only specified layers. An exemplary data flow diagram of filtered analysis is shown in FIG. 10. HTTP frames 1002, POP3 frames 1004, FTP frames 1006, and RPC frames 1008 are input to filter processing engine 322. Each frame includes a number of layers of protocols. For example, HTTP frames 1002 include Ethernet, Internet Protocol (IP), Transmission Control Protocol (TCP), and HTTP layers, POP3 frames include Ethernet, IP, TCP, and POP3 layers, FTP frames include Ethernet, IP, TCP, and FTP layers, and RPC frames include Ethernet, IP, UDP, and RPC layers.

In the example shown in FIG. 10, filter processing engine 322 is configured to pass only HTTP and FTP frames and analysis block 304 is configured to analyze only HTTP and TCP layers. The only types of frame that are passed to analysis block 304 are HTTP frames 1002 and FTP frames 1006. Analysis block 304 only analyzes HTTP and TCP layers included in the frames. The output expert objects 1010 include only HTTP layers and TCP layers only for those frames that contain either HTTP or FTP layers.

Figure 11:
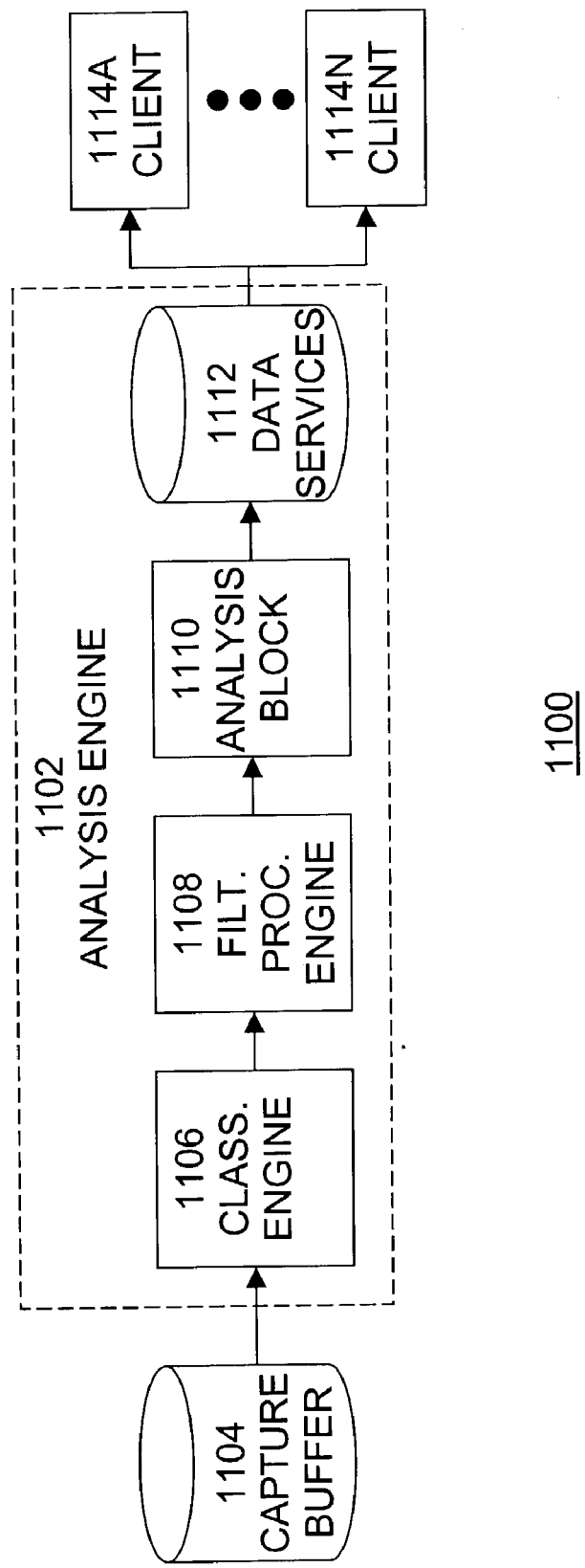
FIG. 11 is an exemplary block diagram of a system including a basic deployment of the analysis engine shown in FIG. 2.

Analysis engine 104 may be deployed in a variety of configurations. Three preferred deployments are termed basic, daisy-chain, and hierarchical. The basic deployment is the simplest arrangement for system including analysis engine 104 and forms the basis of the daisy-chain, and hierarchical deployments. An exemplary block diagram of a system 1100 including a basic deployment of an analysis engine 1102 is shown in FIG. 11. System 1100 includes analysis engine 1102, and capture buffer 1104. Analysis engine 1102 includes classification engine 1106, filter processing engine 1108, analysis block 1110, and data services 1112. Analysis engine 1102 is communicatively connected to one or more clients 1114A–N. The basic deployment provides the capability to analyze network frames to produce a reduced data set of analysis. It has a single source for captured frames, and the output could be stored to a local device or passed on to a client.

Figure 12:
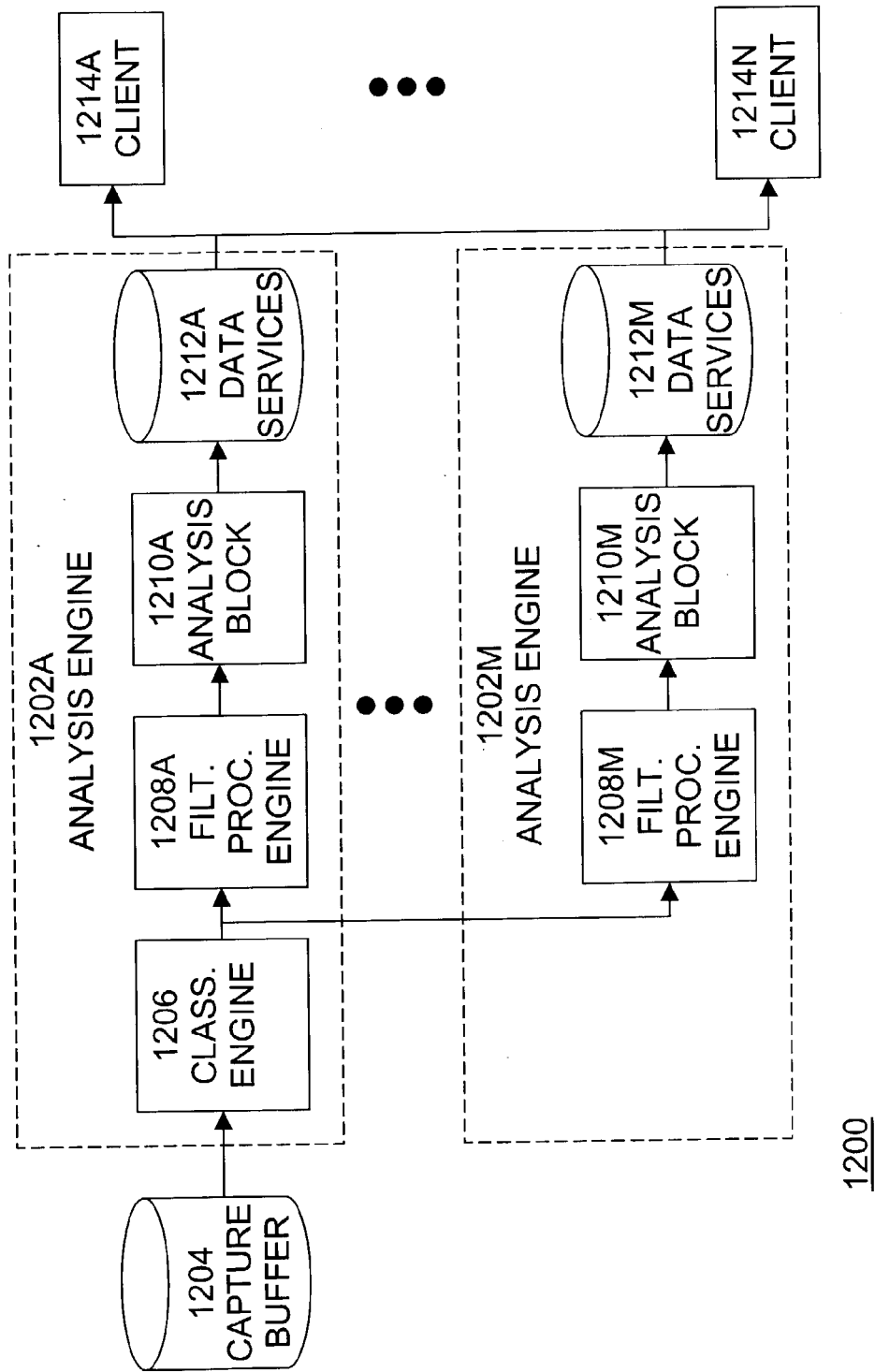
FIG. 12 is an exemplary block diagram of a system 1200 including a daisy-chain deployment of the analysis engine shown in FIG. 2.

The daisy-chain deployment builds upon the basic deployment. It has a single source for captured frames, but has multiple analysis engines plugged into a single classification engine. An exemplary block diagram of a system 1200 including a daisy-chain deployment is shown in FIG. 12. System 1200 includes a plurality of analysis engines 1202A–M, and a single capture buffer 1204. Analysis engine 1202A is communicatively connected to capture buffer 1204 and includes classification engine 1206, filter processing engine 1208A, analysis block 1210A, and data services 1212A. The remaining analysis engines, such as analysis engine 1202M, are communicatively connected to the output of classification engine 1206 of analysis engine 1202A. The remaining analysis engines, such as analysis engine 1202M, need not include their own classification engine, as they receive their data from the output of classification engine 1206. Each remaining analysis engine, such as analysis engine 1202M, includes a filter processing engine, such as filter processing engine 1208M, an analysis block, such as analysis block 1210M, and data services, such as data services 1212M. Each analysis engine 1202A–M is communicatively connected to one or more clients 1214A–N.

The daisy-chain deployment is similar to a multicast approach, where there will exist a root and multiple leafs connected to the root. Each of the analysis engines connected can provide different types of analysis on the same captured frame set. The benefit from the daisy-chain deployment is the capability of distributed processing. For example, a platform that has multiple processors can have separate analysis engines on each of the processors, which can provide a boost in performance and a more focused analysis.

Figure 13:
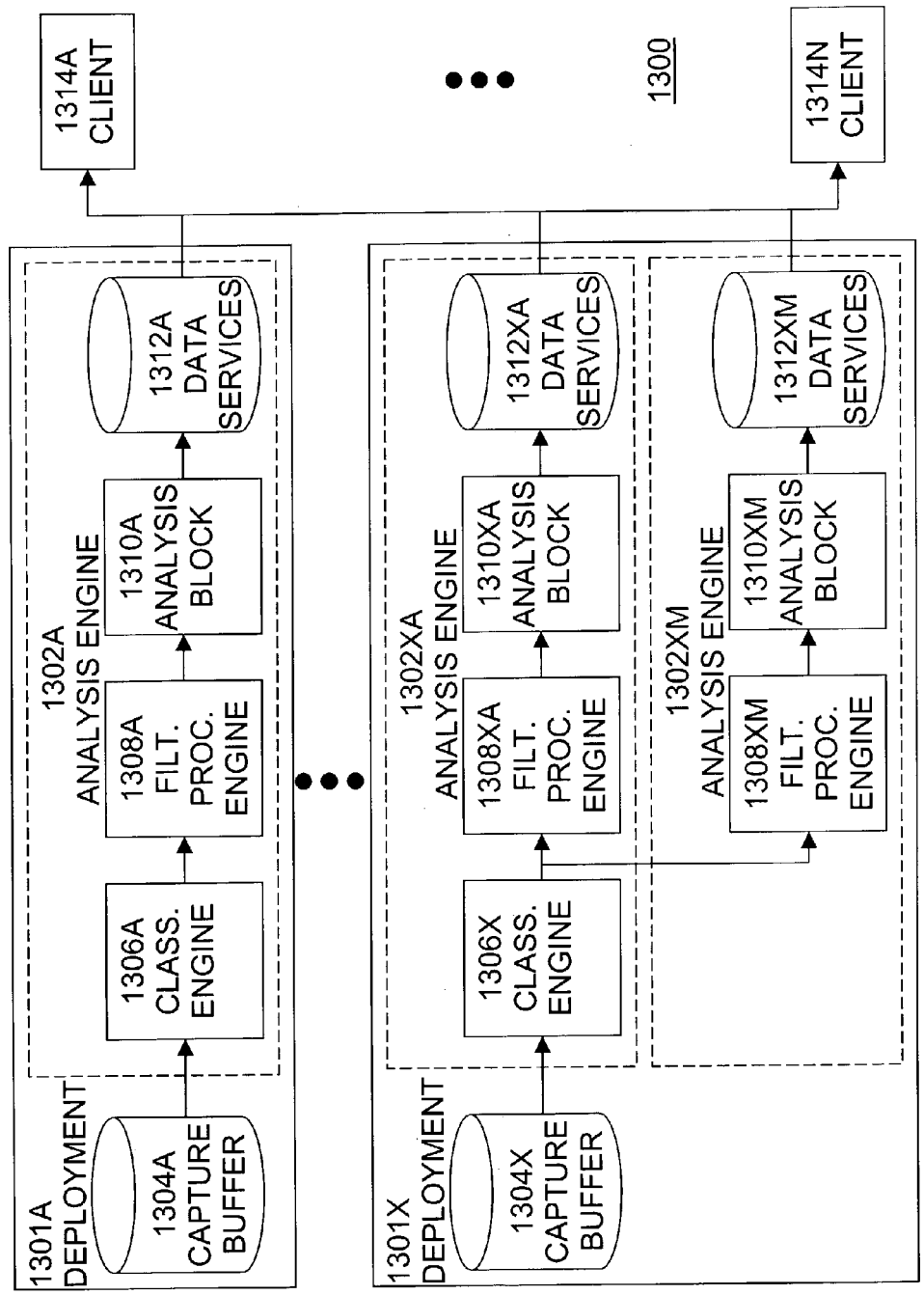
FIG. 13 is an exemplary block diagram of a system 1300 including a hierarchical deployment of the analysis engine shown in FIG. 2.

The hierarchical deployment can be built from either the basic deployment, the daisy-chain deployment or a mixture of the two. The hierarchical deployment provides the capability of layering applications and functionality on top of the existing components. By layering the functionality, the system has the capability of providing more robust and advanced services to the user. An exemplary block diagram of a system 1300 including a hierarchical deployment is shown in FIG. 13. Hierarchical deployment 1300 may include one or more basic deployments, such as basic deployment 1301A, and/or one or more daisy-chain deployments, such as daisy-chain deployment 1301X.

Each basic deployment, such as basic deployment 1301A, includes an analysis engine, such as analysis engine 1302A, and an capture buffer, such as capture buffer 1304A. Analysis engine 1302A includes classification engine 1306A, filter processing engine 1308A, analysis block 1310A, and data services 1312A.

Each daisy-chain deployment, such as daisy-chain deployment 1301X includes a plurality of analysis engines, such as analysis engines 1302C-XM, and a single capture buffer, such as capture buffer 1304X. Analysis engine 1302XA is communicatively connected to capture buffer 1304X and includes classification engine 1306X, filter processing engine 1308XA, analysis block 1310XA, and data services 1312XA. The remaining analysis engines, such as analysis engine 1302XM, are communicatively connected to the output of classification engine 1306X of analysis engine 1302XA. The remaining analysis engines, such as analysis engine 1302XM, need not include their own classification engine, as they receive their data from the output of classification engine 1306X. Each remaining analysis engine, such as analysis engine 1302XM, includes a filter processing engine, such as filter processing engine 1308XM, an analysis block, such as analysis block 1310XM, and data services, such as data services 1312XM.

Each analysis engine, such as analysis engines 1302A-1302XA-1302XM are communicatively connected to one or more clients 1314A–N.

Figure 14:
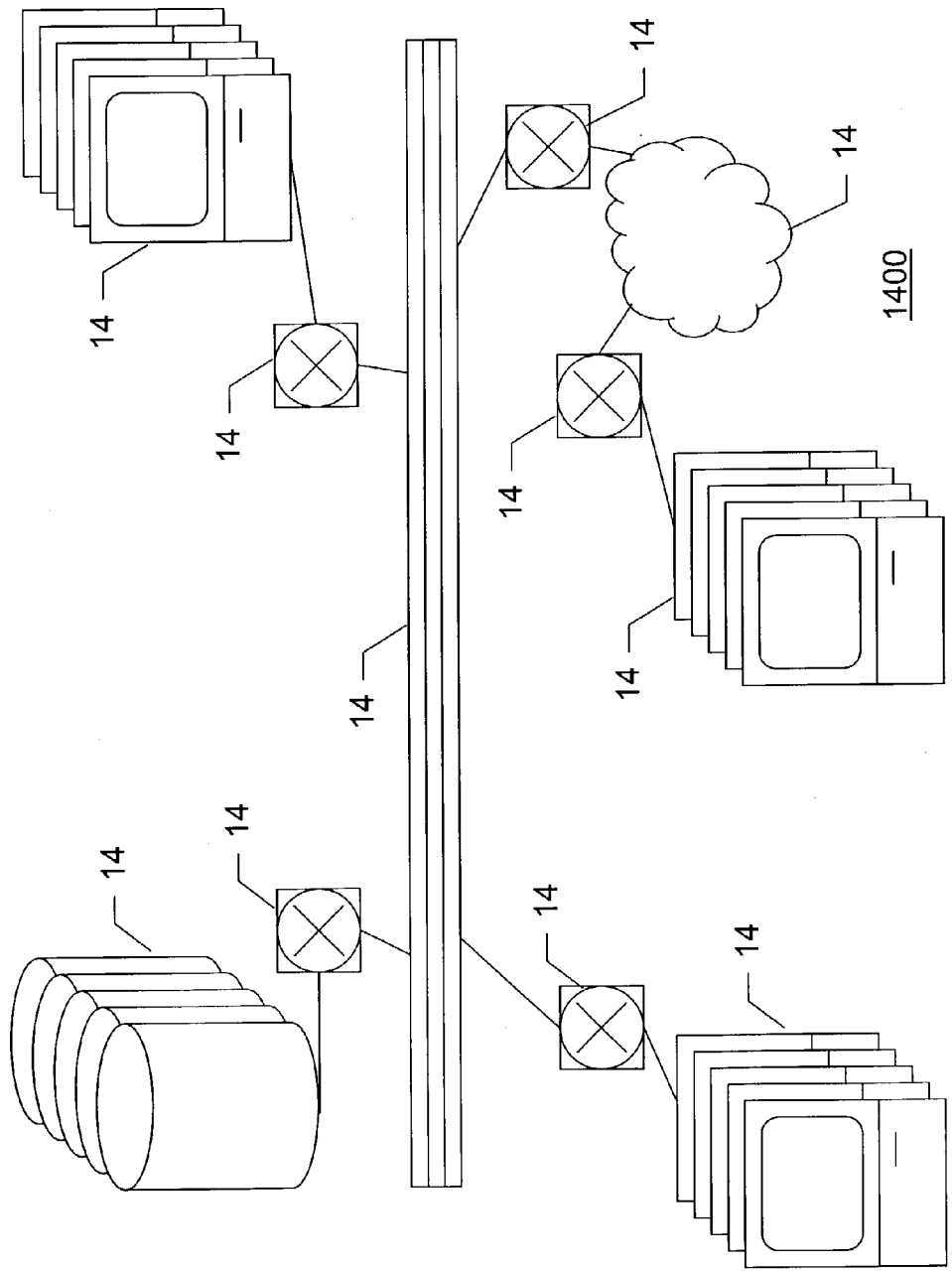
FIG. 14 is an exemplary block diagram of a network system in which the present invention may be implemented.

An exemplary block diagram of a network system 1400 in which the present invention may be implemented is shown in FIG. 14.

Figure 15:
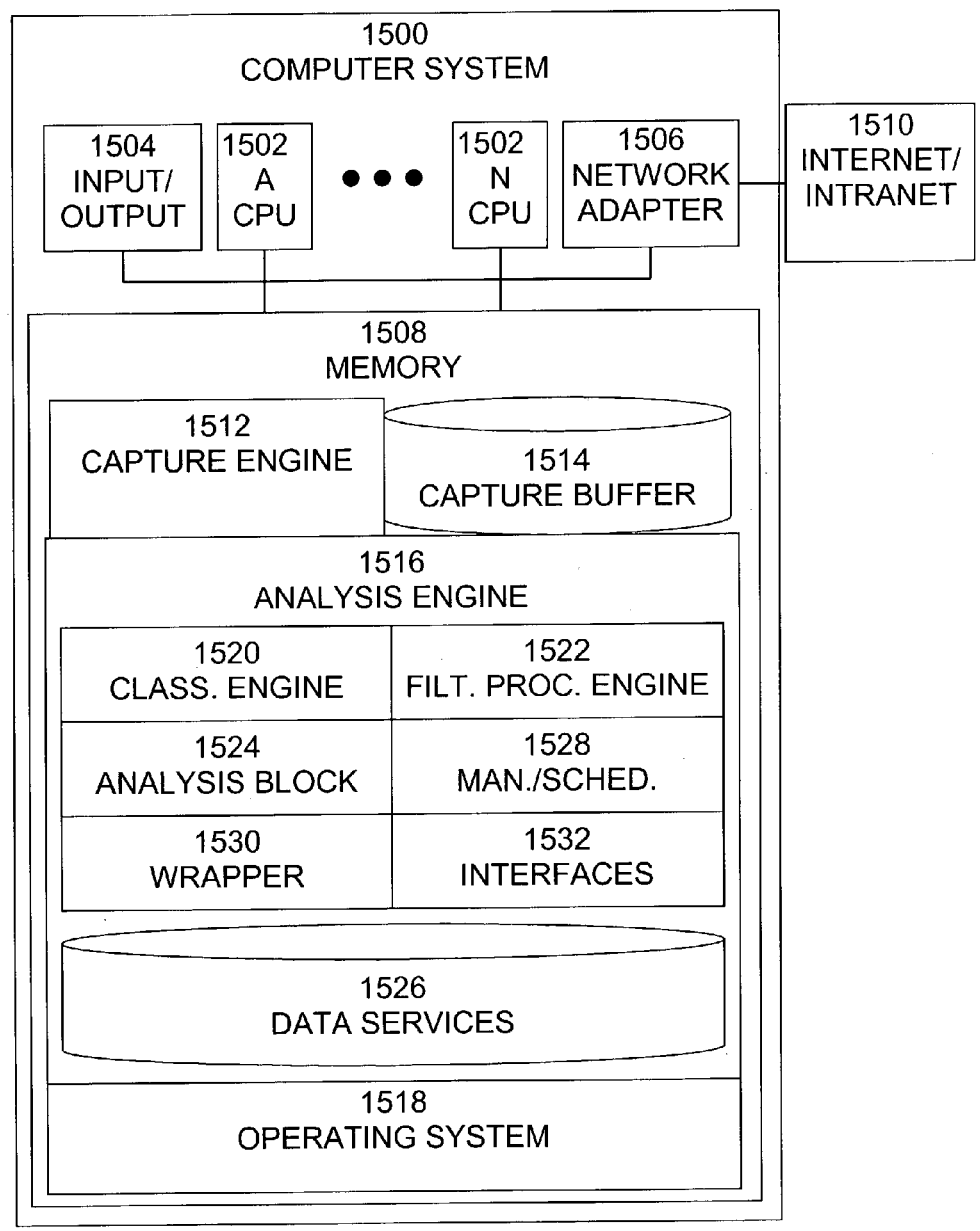
FIG. 15 is an exemplary block diagram of a system in which the present invention may be implemented.

An exemplary block diagram of a system in which the present invention may be implemented is shown in FIG. 15. System 1500 is typically a programmed general-purpose computer system, such as a personal computer, workstation, server system, and minicomputer or mainframe computer. System 1500 includes one or more processors (CPUs) 1502A–1502N, input/output circuitry 1504, network adapter 1506, and memory 1508. CPUs 1502A–1502N execute program instructions in order to carry out the functions of the present invention. Typically, CPUs 1502A–1502N are one or more microprocessors, such as an INTEL PENTIUM® processor. FIG. 15 illustrates an embodiment in which System 1500 is implemented as a single multiprocessor computer system, in which multiple processors 1502A–1502N share system resources, such as memory 1508, input/output circuitry 1504, and network adapter 1506. However, the present invention also contemplates embodiments in which System 1500 is implemented as a plurality of networked computer systems, which may be single-processor computer systems, multi-processor computer systems, or a mix thereof.

Input/output circuitry 1504 provides the capability to input data to, or output data from, database/System 1500. For example, input/output circuitry may include input devices, such as keyboards, mice, touchpads, trackballs, scanners, etc., output devices, such as video adapters, monitors, printers, etc., and input/output devices, such as, modems, etc. Network adapter 1506 interfaces database/

System 1500 with Internet/intranet 1510. Internet/intranet 1510 may include one or more standard local area network (LAN) or wide area network (WAN), such as Ethernet, Token Ring, the Internet, or a private or proprietary LAN/WAN.

Memory 1508 stores program instructions that are executed by, and data that are used and processed by, CPU 1502 to perform the functions of system 1500. Memory 1508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 15, memory 1508 includes capture engine 1512, capture buffer 1514, analysis engine 1516, and operating system 1518, classification engine 1514, filter processing engine 26. Capture engine 1512 captures network frames from a network interface. The captured frames are pushed into and temporarily stored in capture buffer 1514. The interface to capture buffer 1514 provides the input to analysis engine 1516. Analysis engine 1516 includes classification engine 1520, filter processing engine 1522, analysis block 1524, data services block 1526, manager/scheduler 1528, wrapper 1530, and interfaces 1532. Analysis engine 1516 is contained by wrapper 1530, while interfaces 1532 provides a plurality of interfaces, such as a frames interface, events interface, configuration interface, data stream interface, and expert object interface.

Classification engine 1520 parses the received frames and provides pre-analysis of the frames to generate classification information on a flow-basis and on a per packet-basis. Pre-analysis includes processing such as de-multiplexing the protocols of the frame, deriving stateful information on the frame and building a model of the flows representing the network objects defined in the set of frames. With the pre-analysis of the frame, the filter engine can filter frames (include/exclude) on specific protocols and/or network addresses defined in the frame, thus providing a filtered set of frames to be posted to analysis engine 1516.

Filter processing engine 1522 reduces the set of frames that have entered the system based on the classification information from classification engine 1520 and focuses on a set of conversations. Filters are based on protocols, network addresses and protocol dependent information. Filter processing engine 1522 provides the means of discarding frames, which will reduce the set of frames analyzed (posted to analysis block 1516). The basis of discarding may result from the combination set of protocols enabled/disabled, the set of network addresses included/excluded or any protocol specific filtering that may be required.

Analysis block 1524 performs detailed analysis on the contents of the filtered frames, which are delivered in the form of frames/flow records posted by filter processing engine 1522. A number of different types of analysis and granularities of analysis may be carried out. Analysis block 1524 creates network/flow objects based on the analysis. Analysis block 1524 includes a number of specific analysis processing components as defined by the packages, modes and profiles. For example, analysis block 1524 may include statistical analysis, performance analysis, diagnostics analysis, security analysis, and other types of analysis Data services 1526 include an expert object database, which is a repository for the objects created. Data services 1526 provide short-term persistence of the data objects that are created, and maintains the integrity of this data. In addition, data services 1526 provide the capability for the stored data to be retrieved by a multitude of clients.

Manager/Scheduler 1528 provides the configuration capability of the system and the coordination/interfacing of components within the system and components external to the system.

Operating system 1528 provides overall system functionality.

As shown in FIG. 15, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 16:
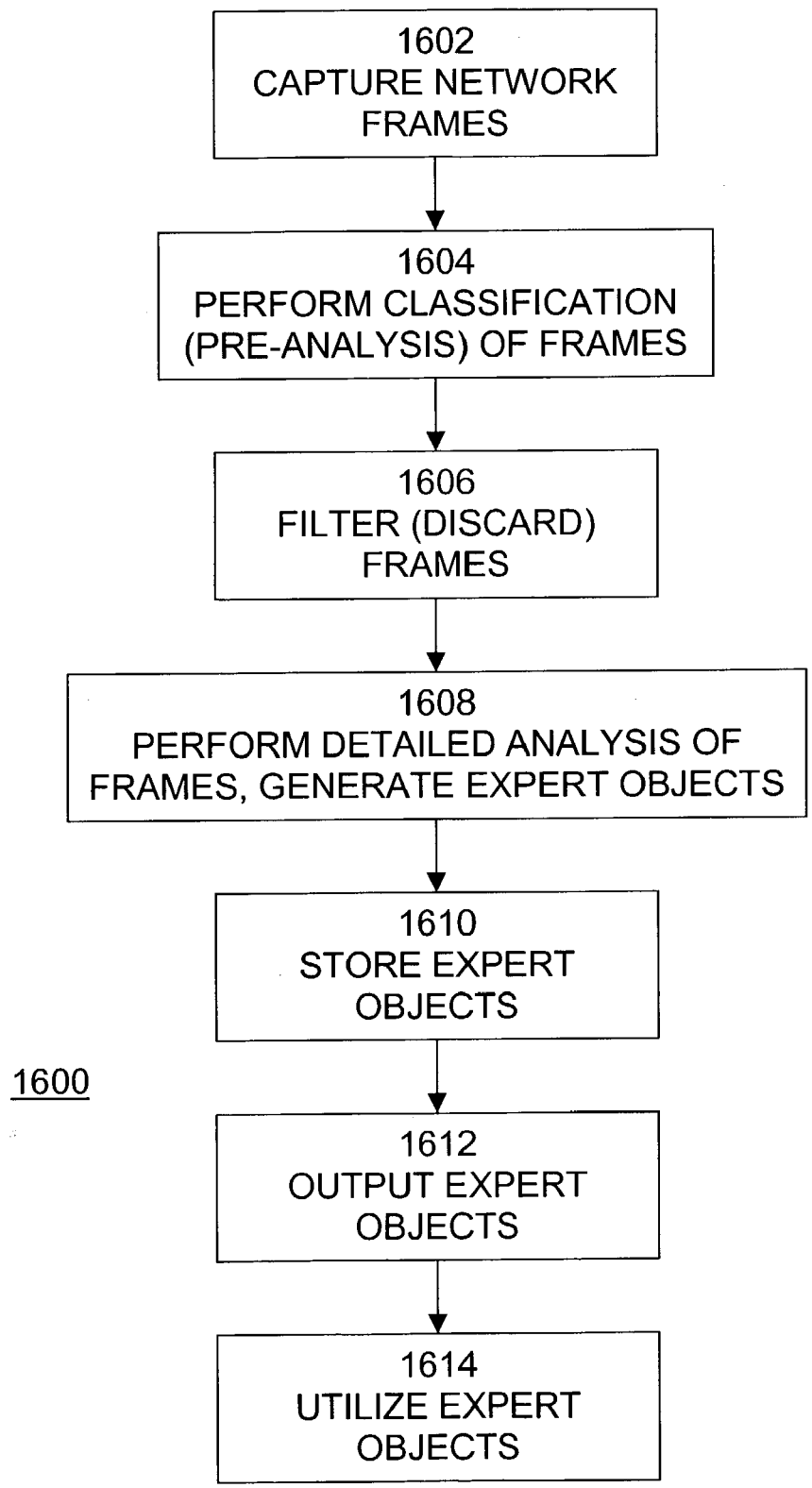
FIG. 16 is an exemplary flow diagram of a process of network traffic analysis of the present invention.

A process 1600 of network traffic analysis of the present invention is shown in FIG. 16. Process 1600 begins with step 1602, in which frames of network traffic are captured from a data communication network. In step 1604, classification (pre-analysis) of the captured frames is performed and classification information is generated for each pre-analyzed frame. Pre-analysis includes processing such as de-multiplexing the protocols of the frame, deriving stateful information on the frame, and building a model of the flows representing the network objects defined in the set of frames. With the pre-analysis of the frame, filter processing can filter frames (include/exclude) on specific protocols and/or network addresses defined in the frame, thus providing a filtered set of frames to be analyzed.

In step 1606, the classified frames are filtered to reduce the set of frames that have entered the system, based on the classification information generated in step 1604. Filter processing is based on protocols, network addresses and protocol dependent information of the frames. Filter processing provides the means of discarding frames, which will reduce the set of frames that will be analyzed. The basis of discarding may result from the combination set of protocols enabled/disabled, the set of network addresses included/excluded or any protocol specific filtering that may be required.

In step 1608, detailed analysis of the contents of the filtered frames is performed and expert objects representing the results of the analysis are generated. The filtered frames are delivered in the form of frames/flow records filter processing step 1606. A number of different types of analysis and granularities of analysis may be carried out. Analysis step 1608 creates network/flow objects based on the analysis. Analysis step 1608 may include a number of specific analysis processing steps as defined by the packages, modes and profiles. For example, analysis step 1608 may include statistical analysis, performance analysis, diagnostics analysis, security analysis, and other types of analysis In step 1610, the expert objects generated in analysis step 1608 are temporarily stored in order to provide the capability for the expert object data to be retrieved by a multitude of clients. In step 1612, one or more of the stored expert objects is output to, or retrieved by, one or more clients. In step 1614, the clients may utilized the retrieved expert objects, for example, to generate reports relating to the analyzed network traffic.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for network traffic analysis comprising:
a classification engine operable to parse received frames, each frame comprising a plurality of layers of protocols and each frame having a type corresponding to an application layer protocol, and to provide pre-analysis of the received frames to generate classification information on a flow-basis and on a per packet-basis;
a filter processing engine operable to reduce the received frames based on a type of each frame indicated by the generated classification information to form information representing filtered frames; and
an analysis block operable to perform detailed analysis on layers of protocols of the filtered frames and generate objects representing the analysis, wherein the filter processing engine and the analysis block enable analysis of the received frames in different modes, including:
a first mode wherein the filter processing engine reduces the received frames by passing only specified types of frames and the analysis block performs detailed analysis on all layers of protocols of the filtered frames;
a second mode wherein the filter processing engine passes all types of frames and the analysis block performs detailed analysis on only specified layers of protocols of the filtered frames; and
a third mode wherein the filter processing engine reduces the received frames by passing only specified types of frames and the analysis block performs detailed analysis on only specified layers of protocols of the filtered frames.

2. The system of claim 1, wherein the protocols comprise at least one of Internet protocol, file transfer protocol, transmission control protocol, hypertext transmission protocol, post office protocol, user datagram protocol, remote procedure call protocol, or Ethernet protocol.

3. A method of network traffic analysis comprising:
performing pre-analysis of received frames, each frame comprising a plurality of layers of protocols and each frame having a type corresponding to an application layer protocol, to generate classification information on a flow-basis and on a per packet-basis;
filtering the received frames to reduce the received frames based on type of each frame indicated by the generated classification information to form information representing filtered frames; and
performing detailed analysis on layers of protocols of the filtered frames and generating objects representing the analysis, wherein the analysis of the received frames is performed in different modes, wherein
in a first mode the step of filtering the received frames includes passing only specified types of frames and the step of performing detailed analysis on layers includes analyzing all layers of protocols of the filtered frames;
in a second mode the step of filtering the received frames includes passing all types of frames and the step of performing detailed analysis on layers includes analyzing only specified layers of protocols of the filtered frames; and
in a third mode the step of filtering the received frames includes passing only specified types of frames and the step of performing detailed analysis on layers includes analyzing only specified layers of protocols of the filtered frames.

4. The method of claim 3, wherein the protocols comprise at least one of Internet protocol, file transfer protocol, transmission control protocol, hypertext transmission protocol, post office protocol, user datagram protocol, remote procedure call protocol, or Ethernet protocol.

5. A system for network traffic analysis comprising:
a processor operable to execute computer program instructions;
a memory operable to store computer program instructions executable by the processor; and
computer program instructions stored in the memory and executable to perform the steps of:
performing pre-analysis of received frames, each frame comprising a plurality of layers of protocols and each frame having a type corresponding to an application layer protocol, to generate classification information on a flow-basis and on a per packet-basis;
filtering the received frames to reduce the received frames based on a type of each frame indicated by the generated classification information to form information representing filtered frames; and
performing detailed analysis on layers of protocols of the filtered frames and generating objects representing the analysis, wherein the analysis of the received frames is performed in different modes, wherein in a first mode the step of filtering the received frames includes passing only specified types of frames and the step of performing detailed analysis on layers includes analyzing all layers of protocols of the filtered frames;

in a second mode the step of filtering the received frames includes passing all types of frames and the step of performing detailed analysis on layers includes analyzing only specified layers of the filtered frames; and in a third mode the step of filtering the received frames includes passing only specified types of frames and the step of performing detailed analysis on layers includes analyzing only specified layers of protocols of the filtered frames.

6. The system of claim 5, wherein the protocols comprise at least one of Internet protocol, file transfer protocol, transmission control protocol, hypertext transmission protocol, post office protocol, user datagram protocol, remote procedure call protocol, or Ethernet protocol.

7. A computer program product for network traffic analysis comprising:
   a computer readable medium;
   computer program instructions, recorded on the computer readable medium, executable by a processor, for performing the steps of
   performing pre-analysis of received frames, each frame comprising a plurality of layers of protocols and each frame having a type corresponding to an application layer protocol, to generate classification information on a flow-basis and on a per packet-basis;
   filtering the received frames to reduce the received frames based on type of each frame indicated by the generated classification information to form information representing filtered frames; and
   performing detailed analysis on layers of protocols of the filtered frames and generating objects representing the analysis, wherein the analysis of the received frames is performed in different modes, wherein in a first mode the step of filtering the received frames includes passing only specified types of frames and the step of performing detailed analysis on layers includes analyzing all layers of protocols of the filtered frames;

in a second mode the step of filtering the received frames includes passing all types of frames and the step of performing detailed analysis on layers includes analyzing only specified layers of protocols of the filtered frames; and in a third mode the step of filtering the received frames includes passing only specified types of frames and the step of performing detailed analysis on layers includes analyzing only specified layers of protocols of the filtered frames.

8. The computer program product of claim 7, wherein the protocols comprise at least one of Internet protocol, file transfer protocol, transmission control protocol, hypertext transmission protocol, post office protocol, user datagram protocol, remote procedure call protocol, or Ethernet protocol.

* * * * *